United States Patent
Kim et al.

(10) Patent No.: US 11,255,281 B2
(45) Date of Patent: Feb. 22, 2022

(54) CONTROL METHOD FOR CYLINDER DEACTIVATION AND ENGINE TO WHICH THE SAME IS APPLIED

(71) Applicants: HYUNDAI MOTOR COMPANY, Seoul (KR); KIA MOTORS CORPORATION, Seoul (KR)

(72) Inventors: Hyeon Woo Kim, Seoul (KR); Kyoung Pyo Ha, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 108 days.

(21) Appl. No.: 16/860,657

(22) Filed: Apr. 28, 2020

(65) Prior Publication Data

US 2021/0071604 A1 Mar. 11, 2021

(30) Foreign Application Priority Data

Sep. 11, 2019 (KR) .......................... 10-2019-0113033

(51) Int. Cl.
*F02D 41/00* (2006.01)
*F02D 41/30* (2006.01)
(Continued)

(52) U.S. Cl.
CPC ..... *F02D 41/0087* (2013.01); *F02D 13/0203* (2013.01); *F02D 17/04* (2013.01); *F02D 41/30* (2013.01)

(58) Field of Classification Search
CPC ...... F02D 41/0087; F02D 17/02; F02D 17/04; F02D 13/0203; F02D 13/0207; F02D 13/0215; F02D 13/0234; F02D 13/06
See application file for complete search history.

(56) References Cited

U.S. PATENT DOCUMENTS

| | | | |
|---|---|---|---|
| 6,237,559 B1 * | 5/2001 | Russ | F02B 75/22 123/198 F |
| 7,600,498 B2 | 10/2009 | Diggs | |

(Continued)

FOREIGN PATENT DOCUMENTS

| | | |
|---|---|---|
| EP | 2947662 A1 | 11/2015 |
| KR | 10-2009-0103180 A | 10/2009 |

(Continued)

OTHER PUBLICATIONS

Ha et al., Development of Continuously Variable Valve Duration (CVVD) Engine, 25$^{th}$ Aachen Colloquium Automobile and Engine Technology, pp. 887-902 (2016).

(Continued)

*Primary Examiner* — Sizo B Vilakazi
*Assistant Examiner* — Anthony L Bacon
(74) *Attorney, Agent, or Firm* — Lempia Summerfield Katz LLC

(57) ABSTRACT

An engine includes: a duration apparatus for adjusting an opening duration of an intake valve, a Cylinder De-Activation (CDA) apparatus for controlling deactivation of an exhaust valve, an igniter, an injector for injecting a fuel, an operation state signal unit for measuring an operation state of a vehicle, and a controller for controlling the operations of the duration apparatus, the CDA apparatus, the igniter, and the injector based on an output signal from the operation state signal unit. A control method for this engine includes: determining, by the controller, whether the operation state of the vehicle corresponds to a CDA operation mode; and when the CDA operation mode is determined, operating the CDA apparatus so as to stop the operations of the igniter and the injector, increase an opening duration of the intake valve, and deactivate the exhaust valve by controlling the CDA apparatus.

19 Claims, 13 Drawing Sheets

(51) Int. Cl.
*F02D 13/02* (2006.01)
*F02D 17/04* (2006.01)

(56) References Cited

U.S. PATENT DOCUMENTS

| | | | |
|---|---|---|---|
| 9,988,947 B2 | 6/2018 | Haefner | |
| 2010/0175645 A1* | 7/2010 | Berger | F02D 13/06 123/90.15 |
| 2012/0083959 A1 | 4/2012 | Dolgov et al. | |
| 2013/0092127 A1 | 4/2013 | Pirjaberi et al. | |
| 2013/0317725 A1* | 11/2013 | Brennan | F02D 13/06 701/105 |
| 2016/0032869 A1* | 2/2016 | Boyer | F02D 17/02 123/568.11 |
| 2017/0355374 A1* | 12/2017 | Glugla | B60W 30/18136 |

FOREIGN PATENT DOCUMENTS

| | | |
|---|---|---|
| KR | 10-2011-0137155 A | 12/2011 |
| KR | 10-2012-0061674 A | 6/2012 |
| KR | 10-1326818 B1 | 11/2013 |
| KR | 10-2013-0132790 A | 12/2013 |
| KR | 10-1483708 B1 | 1/2015 |
| KR | 10-1628102 B1 | 6/2016 |
| KR | 10-1684562 B1 | 12/2016 |
| KR | 10-2017-0012304 A | 2/2017 |
| KR | 10-1849438 B1 | 4/2018 |
| KR | 10-1855767 B1 | 5/2018 |

OTHER PUBLICATIONS

Ihlemann et al., Cylinder Deactivation, A technology with a future or a niche application?, pp. 172-187.

* cited by examiner

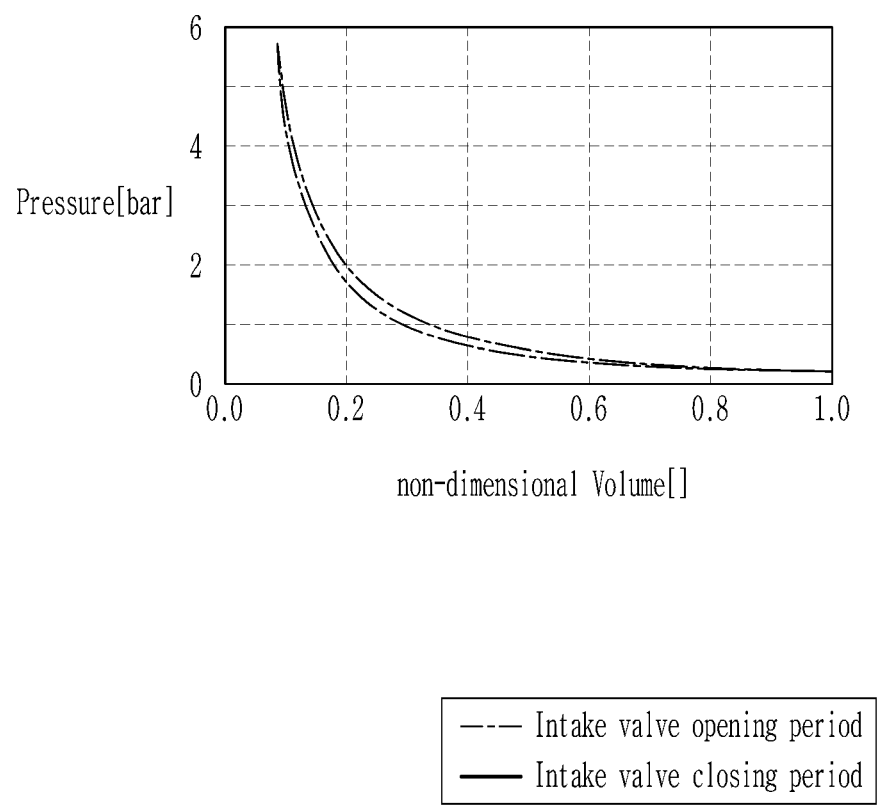
FIG. 10A "PRIOR ART"

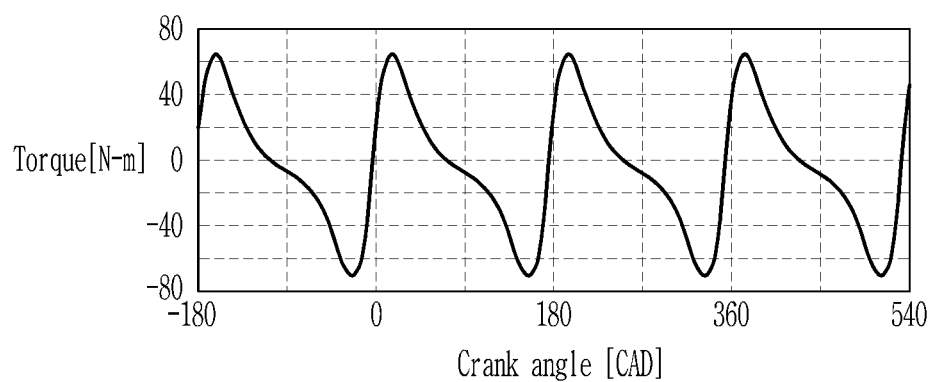
FIG. 11A "PRIOR ART"

CONTROL METHOD FOR CYLINDER DEACTIVATION AND ENGINE TO WHICH THE SAME IS APPLIED

CROSS-REFERENCE TO RELATED APPLICATION

This application claims priority to and the benefit of Korean Patent Application No. 10-2019-0113033, filed on Sep. 11, 2019, the entire contents of which are incorporated herein by reference.

FIELD

The present disclosure relates to a control method for cylinder deactivation, and an engine to which the same is applied.

BACKGROUND

The statements in this section merely provide background information related to the present disclosure and may not constitute prior art.

An internal combustion engine generates power by burning fuel in a combustion chamber in an air media drawn into the chamber. Intake valves are operated by a camshaft in order to intake the air, and the air is drawn into the combustion chamber while the intake valves are open. In addition, exhaust valves are operated by a camshaft, and a combustion gas is exhausted from the combustion chamber while the exhaust valves are open.

Optimal operation of the intake valves and the exhaust valves depends on a rotation speed of the engine. That is, an optimal lift or optimal opening/closing timing of the valves depends on the rotation speed of the engine.

In order to achieve such optimal valve operation depending on the rotation speed of the engine, various researches, such as designing of a plurality of cams and a variable valve lift (VVL) apparatus or a continuously variable valve lift (CVVL) apparatus that can change valve lift according to engine speed, have been undertaken.

Further, a variable valve timing (VVT) or continuously variable valve timing (CVVT) apparatus technology for adjusting opening times of the valves has been developed, and these technologies are techniques in which the valve open/close times are simultaneously changed with a valve duration being fixed.

Also, a continuously variable valve duration (CVVD) apparatus technology for varying durations by adjusting opening and/or closing times of the valves in a state that a lift of the valve is fixed has been developed.

In addition, a CDA (Cylinder De-Activation) apparatus has been studied as a technique for realizing valve deactivation.

However, if a separate device is applied to both the intake and exhaust valves to deactivate the intake and exhaust valves, a system configuration becomes complicated.

The above information disclosed in this Background section is only for enhancement of understanding of the background of the present disclosure and therefore it may contain information that does not form the prior art that is already known to a person of ordinary skill in the art.

SUMMARY

The present disclosure provides an engine and a method for controlling the engine capable of improving fuel consumption by implementing a CDA apparatus while adjusting the duration or lift of the intake valve according to the operating state of the engine.

In one form of the present disclosure, a control method of an engine is provided for controlling cylinder deactivation of the engine, and the engine may include: a duration apparatus for adjusting an opening duration of an intake valve, a Cylinder De-Activation (CDA) apparatus for controlling deactivation of an exhaust valve, an igniter, an injector for injecting a fuel, an operation state signal unit for measuring an operation state of a vehicle and outputting a corresponding signal, and a controller for controlling the operations of the duration apparatus, the CDA apparatus, the igniter, and the injector according to an output signal of the operation state signal unit. In particular, the control method includes: determining, by the controller, whether the operation state of the vehicle corresponds to a CDA operation mode based on the output signal of the operation state signal unit; and when the CDA operation mode is determined, operating, by the controller, the CDA apparatus. In the CDA operation mode, the controller stops the operations of the igniter and the injector, increases an opening duration of the intake valve by controlling the operation of the duration apparatus, and stops the operation of the exhaust valve by controlling the operation of the CDA apparatus.

In operating the CDA apparatus, the controller may sequentially output a signal for stopping the operation of the igniter and the injector, a signal for increasing the opening duration of the intake valve by controlling the operation of the duration apparatus, and a signal for stopping the operation of the exhaust valve by controlling the operation of the CDA apparatus.

The controller may control the operation of the CDA apparatus so as to stop the operation of the exhaust valve after opening the exhaust valve at least one time after the signal for stopping the operations of the igniter and the injector is generated.

In one form, increasing the opening duration of the intake valve may be completed after stopping the operation of the exhaust valve.

The intake valve may be opened before a top dead center in an intake stroke, and may be closed after the top dead center in a compression stroke in the CDA operation mode.

The duration apparatus and the CDA apparatus may both be mounted to all cylinders of the engine, and the controller may sequentially perform the deactivation of all cylinders by controlling the operations of the duration apparatus and the CDA apparatus according to an ignition order.

The duration apparatus may be a continuously variable valve duration (CVVD) apparatus.

The duration apparatus may be a continuously variable valve lift (CVVL) apparatus.

The engine may further include a valve timing apparatus for adjusting an opening timing and a closing timing of the intake valve, and the controller may retard the closing timing of the intake valve by controlling the operation of the valve timing apparatus.

In operating the CDA, the controller may sequentially output a signal for stopping the operations of the igniter and the injector, a signal for increasing the opening duration of the intake valve by controlling the operation of the duration apparatus, a signal for retarding the closing timing of the intake valve by controlling the operation of the valve timing apparatus, and a signal for stopping the operation of the exhaust valve by controlling the operation of the CDA apparatus.

Increasing the opening duration of the intake valve and retarding the closing timing of the intake valve may be completed after stopping the operation of the exhaust valve.

In another form, an engine for controlling cylinder deactivation includes: a duration apparatus for adjusting an opening duration of an intake valve; a valve timing apparatus for adjusting an opening timing and a closing timing of the intake valve; a Cylinder De-Activation (CDA) apparatus for controlling deactivation of an exhaust valve; an igniter; an injector for injecting a fuel; an operation state signal unit for measuring the operation state of the vehicle and outputting a corresponding signal; and a controller for controlling the operations of the duration apparatus, the valve timing apparatus, the CDA apparatus, the igniter, and the injector according to the output signal of the operation state signal unit. In particular, the controller determines a CDA operation mode based on the output signal of the operation state signal unit, and when the CDA operation mode is determined, the controller stops the operation of the igniter and injector, increases the opening duration of the intake valve by controlling the operation of the duration apparatus, retards the closing timing of the intake valve by controlling the operation of the valve timing apparatus, and stops the operation of the exhaust valve by controlling the operation of the CDA apparatus.

In the CDA operation mode, the controller may sequentially output a signal for stopping the operations of the igniter and the injector, a signal for increasing the opening duration of the intake valve by controlling the operation of the duration apparatus, a signal for retarding the closing timing of the intake valve by controlling the operation of the valve timing apparatus, and a signal for stopping the operation of the exhaust valve by controlling the operation of the CDA apparatus.

The controller may control the operation of the CDA apparatus so as to stop the operation of the exhaust valve after opening the exhaust valve at least one time after the signal for stopping the operations of the igniter and the injector is generated.

In one form, increasing the opening duration of the intake valve may be completed after stopping the operation of the exhaust valve.

The intake valve may be opened before a top dead center in an intake stroke and is closed after the top dead center in a compression stroke in the CDA operation mode.

The duration apparatus, the valve timing apparatus, and the CDA apparatus may be mounted to all cylinders of the engine, and the controller may sequentially perform the deactivation of all cylinders by controlling the duration apparatus, the valve timing apparatus, and the CDA apparatus according to an ignition order.

The duration apparatus may be a continuously variable valve duration (CVVD) apparatus.

The duration apparatus may be a continuously variable valve lift (CVVL) apparatus.

According to the control method of the engine for implementing the cylinder deactivation and the engine to which the method is applied according to an exemplary form of the present disclosure, it is possible to apply the CDA apparatus only to the exhaust valve, thereby economically simplifying the system.

The control method of the engine for implementing the cylinder deactivation and the engine to which the method is applied according to an exemplary form of the present disclosure have a further lower pumping mean effective pressure (PMEP) compared with a typical cylinder deactivation technology (deactivation of an intake/exhaust valve), thereby reducing a pumping loss by a pressure difference.

The control method of the engine for implementing the cylinder deactivation and the engine to which the method is applied according to an exemplary form of the present disclosure are operated at a low pressure level in the cylinder deactivation, and accordingly a torque fluctuation of the engine is small compared with the operation of a traditional cylinder deactivation technology, and an NVH characteristic is excellent. Therefore, it is possible to maintain constant speed through torque leveling of the engine during low load constant speed driving of the vehicle (e.g., a cruise mode).

In the control method of the engine for implementing the cylinder deactivation and the engine to which the method is applied according to an exemplary form of the present disclosure, since the intake valve continues to operate during the cylinder deactivation, the inflow and outflow of air is free, the convergence speed is fast during conversion of the engine operation and the cylinder deactivation, and the conversion impact is alleviated.

The control method of the engine for implementing the cylinder deactivation and the engine to which the method is applied according to an exemplary form of the present disclosure may improve fuel consumption in coasting if the deactivation of all cylinders of the engine is possible.

In the control method of the engine for implementing the cylinder deactivation and the engine to which the method is applied according to an exemplary form of the present disclosure, during the cylinder deactivation, there is no flow after the exhaust valve, so a fuel cut may be applied and a catalyst oxidation may be prevented.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 10B:
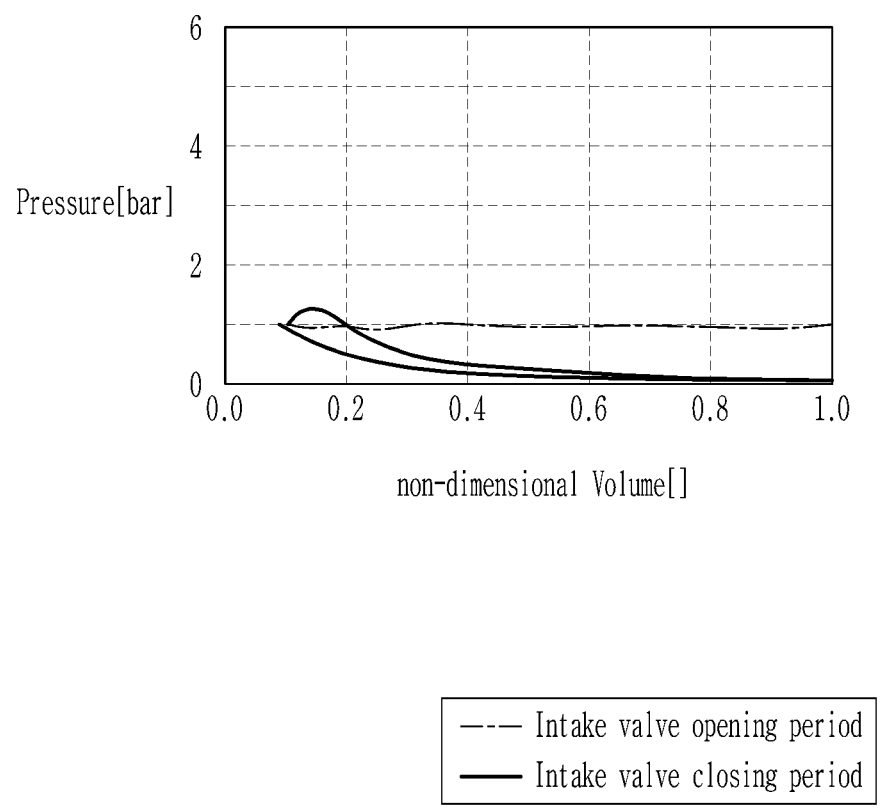
Figure 11B:
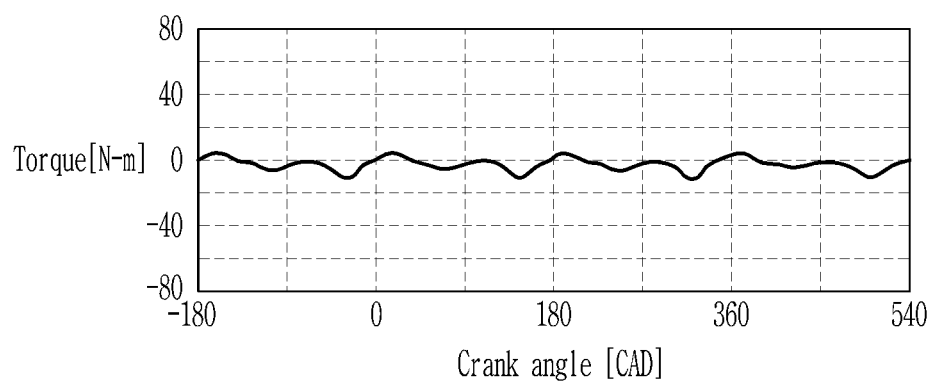

FIGS. 10A and 10B are graphs for comparing a P-V line diagram of a typical engine and a P-V line diagram of an engine for realizing cylinder deactivation according to an exemplary form of the present disclosure; and FIGS. 11A and 11B are graphs for comparing torque changes of a typical engine and an engine for realizing cylinder deactivation according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, only certain exemplary forms of the present disclosure have been shown and described, simply by way of illustration.

As those skilled in the art would realize, the described forms may be modified in various different ways, all without departing from the spirit or scope of the present disclosure.

Throughout the specification, like reference numerals represent the same constituent elements.

In the drawings, the thickness of layers, films, panels, regions, etc., are exaggerated for clarity.

In addition, unless explicitly described to the contrary, the word "comprise" and variations such as "comprises" or "comprising" will be understood to imply the inclusion of stated elements but not the exclusion of any other elements.

An exemplary form of the present disclosure will hereinafter be described in detail with reference to the accompanying drawings.

Figure 1:
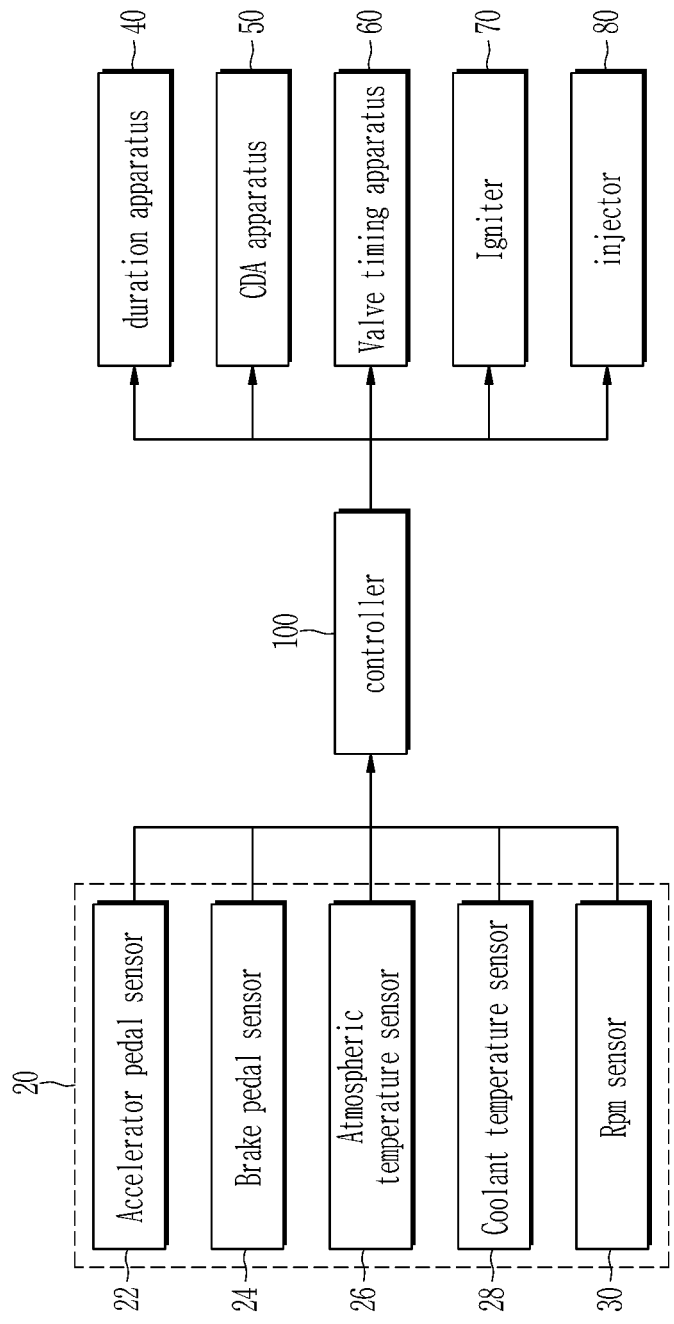
FIG. 1 is a schematic diagram of an engine for realizing cylinder deactivation according to an exemplary form of the present disclosure.

FIG. 1 is a schematic diagram of an engine for realizing cylinder deactivation according to an exemplary form of the present disclosure.

An engine for realizing cylinder deactivation according to an exemplary form of the present disclosure includes: a duration apparatus 40 for adjusting a duration of an intake valve, a CDA apparatus 50 for realizing deactivation of an exhaust valve, an igniter 70, an injector 80 for injecting a fuel, an operation state signal unit 20 for measuring an operation state of a vehicle and outputting a corresponding signal, and a controller 100 for controlling the operations of the duration apparatus 40, the CDA apparatus, the igniter, and the injector according to the output signal of the operation state signal unit 20.

The operation state signal unit 20, for example, may include an accelerator pedal sensor 22 for measuring an operation of an accelerator pedal and outputting a corresponding signal, a brake pedal sensor 24 for measuring an operation of a brake pedal and outputting a corresponding signal, an atmospheric temperature sensor 26 for measuring an atmosphere temperature and outputting a corresponding signal, a coolant temperature sensor 28 for measuring a coolant temperature and outputting a corresponding signal, and an rpm sensor 30 for measuring an rpm (revolutions per minute) of the engine and outputting a corresponding signal.

The controller 10 may be, for example, a microprocessor (e.g., an ECU (Engine Control Unit or Electronic Control Unit)) or hardware including at least one microprocessor operated by a program. The program may include a series of instructions for performing a control method of a vehicle including an ISG function according to one form of the present disclosure.

Figure 2A:
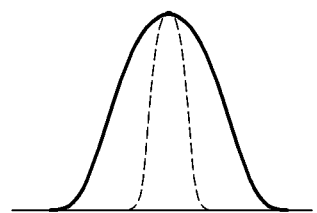
FIGS. 2A, 2B and 2C are graphs respectively showing a valve profile of a continuously variable valve duration apparatus that may be applied to an engine for realizing cylinder deactivation according to an exemplary form of the present disclosure.
Figure 2B:
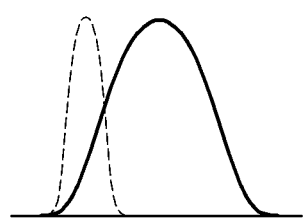
Figure 2C:
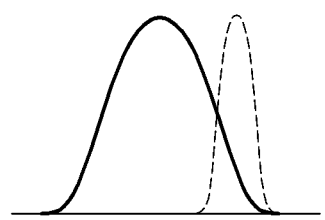

FIGS. 2A, 2B and 2C are graphs respectively showing a valve profile of a continuously variable valve duration apparatus that may be applied to an engine for realizing cylinder deactivation according to an exemplary form of the present disclosure.

The duration apparatus 40, for example, may be a continuously variable valve duration apparatus.

Although a maximum lift of the valve of the continuously variable valve duration apparatus is constant, rotation speed of a cam with respect to a rotation speed of a camshaft is changed according to relative positions of a wheel housing, so that closing and opening timings of the valve is changed. That is, duration of the valve is changed.

According to the relative position of a cam slot, a mounting angle of the valve, and so on, opening and closing timings of the valve may be simultaneously changed as shown in FIG. 2A.

While opening timing of the valve is constant, closing timing of the valve may be retarded or advanced as shown FIG. 2B.

While closing timing of the valve 200 is constant, opening timing of the valve may be retarded or advanced as shown FIG. 2C.

The specific construction and operation of such a continuously variable valve duration apparatus is apparent to those skilled in the art, and for example, Korean Patent No. 10-1628102 discloses the general features of the continuously variable valve duration apparatus and may be referred to.

Figure 3:
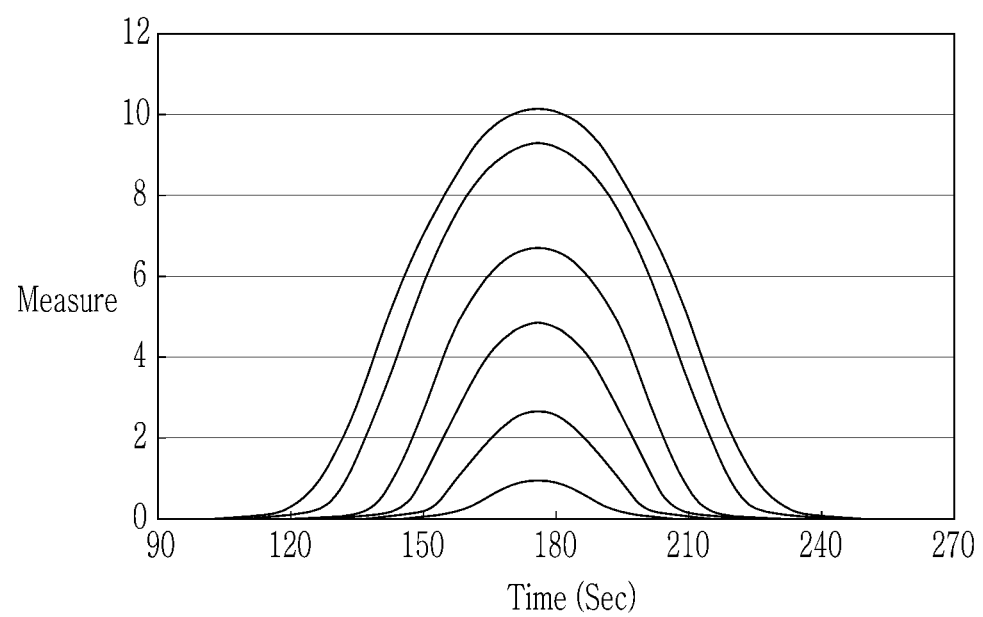
FIG. 3 is a graph showing a valve profile of a continuously variable valve duration apparatus that may be applied to an engine for realizing cylinder deactivation according to an exemplary form of the present disclosure.

FIG. 3 is a graph showing a valve profile of a continuously variable valve duration apparatus that may be applied to an engine for realizing cylinder deactivation according to an exemplary form of the present disclosure.

The duration apparatus 40, for example, may be a continuously variable valve lift apparatus.

As shown in FIG. 3, in the continuously variable valve lift apparatus, the duration of the valve may be changed at the same time as the maximum lift of the valve changes.

The specific configuration and operation of such a continuously variable valve lift apparatus is apparent to those skilled in the art, and for example, Korean Patent Publication No. 10-2009-0103180 may be referred to.

Figure 4:
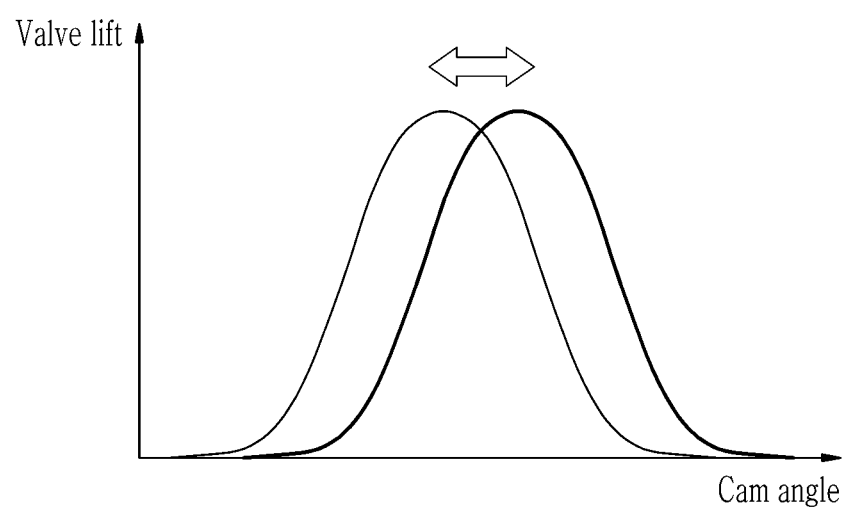
FIG. 4 is a graph showing a valve profile of a continuously variable valve duration apparatus that may be applied to an engine for realizing cylinder deactivation according to an exemplary form of the present disclosure.

FIG. 4 is a graph showing a valve profile of a continuously variable valve duration apparatus that may be applied to an engine for realizing cylinder deactivation according to an exemplary form of the present disclosure.

The engine for realizing the cylinder deactivation according to an exemplary form of the present disclosure may further include a valve timing apparatus 60 for adjusting an opening/closing timings of the intake valve, and the controller 100 may control the operation of the valve timing apparatus 60 according to the output signal of the operation state signal unit 20.

The valve timing apparatus 60, for example, may be the continuously variable valve timing apparatus, as shown in FIG. 4, and in the continuously variable valve timing apparatus, the maximum lift of the valve is constant, in the state that the duration of the valve, the opening timing, and the closing timing of the valve may be simultaneously changed.

The specific configuration and operation of such a continuously variable valve lift apparatus is apparent to those skilled in the art, and for example, Korean Patent Publication No. 10-2011-0137155 and the like may be referred to.

Figure 5:
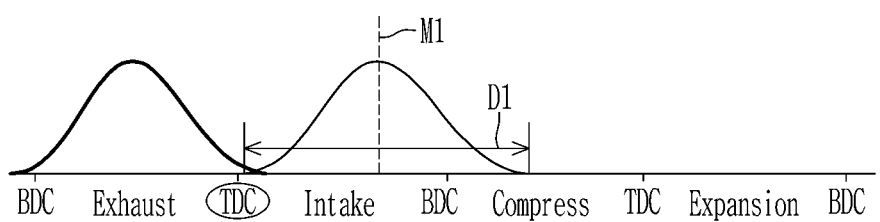
FIG. 5 is a graph showing a valve profile of a typical operation state of an intake valve and an exhaust valve that may be applied to an engine for realizing cylinder deactivation according to an exemplary form of the present disclosure.
Figure 6:
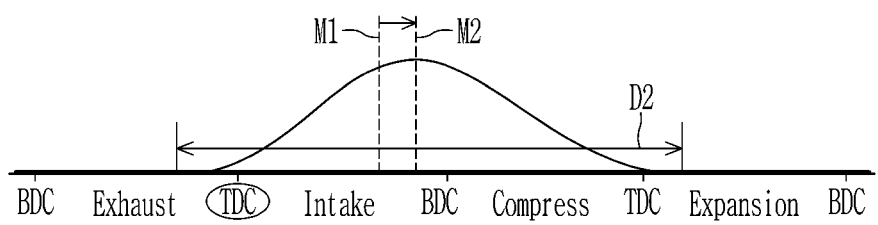
FIG. 6 is a graph showing a valve profile of a CDA operation state of an intake valve and an exhaust valve that may be applied to an engine for realizing cylinder deactivation according to an exemplary form of the present disclosure.

FIG. 5 is a graph showing a valve profile of a typical operation state of an intake valve and an exhaust valve that may be applied to an engine for realizing cylinder deactivation according to an exemplary form of the present disclosure, and FIG. 6 is a graph showing a valve profile of a CDA operation state of an intake valve and an exhaust valve that may be applied to an engine for realizing cylinder deactivation according to an exemplary form of the present disclosure.

Referring to FIG. 1 to FIG. 6, if it is determined that the controller 100 corresponds to the CDA operation mode set according to the output signal of the operation state signal unit 20, the step of the CDA operation may be performed when the CDA operation mode is determined.

In describing the engine and the control method thereof for implementing the cylinder deactivation according to an exemplary form of the present disclosure, the duration apparatus 40 is described as the continuously variable valve lift apparatus for convenience of understanding, but it is not limited thereto, and the continuously variable valve lift apparatus in which the lift and duration of the valve simultaneously change may also be applied.

In a normal operating state, the exhaust valve is normally opened and closed, and the intake valve is opened and closed while realizing a predetermined first valve duration D1 and a predetermined first maximum opening position (MOP) M1 according to the output signal of the operation state signal unit 20.

The first valve duration D1 and the first maximum opening position M1 are values that vary according to the output signal of the operation state signal unit 20, and for convenience of understanding, the first valve duration D1 and the first maximum opening position M1 are each described by setting a crank angle 240 degrees (Duration 240 Crank Angle) and a top dead center based 134 degrees (MOP 134aTDC) in the present form.

The set CDA operation mode may be, for example, a coasting situation in which there are no output signals of the accelerator pedal sensor 22 and the brake pedal sensor 24, a driving situation such as downhill driving, constant speed driving, and the like.

In the case corresponding to the CDA operation mode, the controller 100 stops the operation of the igniter 70 and the injector 80, increases the duration of the intake valve by controlling the operation of the duration apparatus 40, and stops the operation of the exhaust valve by controlling the operation of the CDA apparatus 50.

In addition, in the case corresponding to the CDA operation mode, the controller 100 may control the operation of the valve timing apparatus 60 to retard the timing of the intake valve.

That is, as shown in FIG. 6, the valve opening duration of the intake valve is increased to the second valve duration (D2), and for example, may be increased into the crank angle 440 degrees (Duration 440 Crank Angle), and the opening and closing of the exhaust valve is stopped.

Also, the maximum opening position MOP is retarded to the second maximum opening position M2, and for example, may be retarded into the top dead center based 167 degrees (MOP 167aTDC).

Here, the second valve duration D2 and the second maximum opening position M2 are provided for convenience of understanding, but are not limited thereto.

The intake valve in the CDA operation mode may be opened before top dead center in the intake stroke and closed after top dead center in the compression stroke. That is, the intake valve is opened in the intake stroke and the compression stroke.

Figure 7:
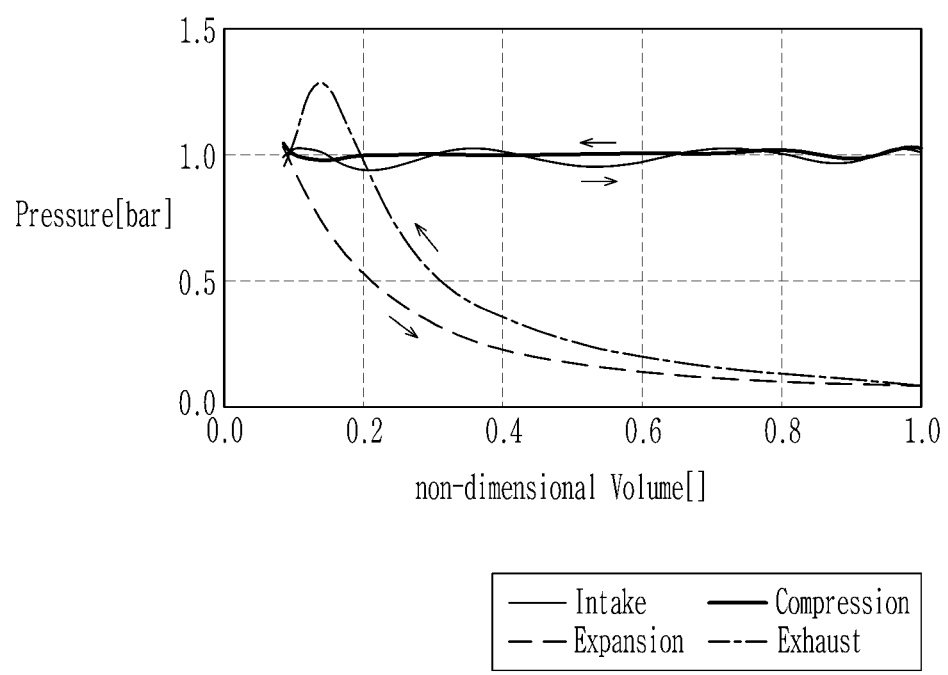
FIG. 7 is a graph showing a P-V line diagram of an engine for realizing cylinder deactivation according to an exemplary form of the present disclosure.

FIG. 7 is a graph showing a P-V line diagram of an engine for realizing cylinder deactivation according to an exemplary form of the present disclosure.

Referring to FIG. 7, the intake stroke and the compression stroke proceed in the state where the intake valve is opened, and thus, the piston moves up and down, an inflow and outflow of fresh air continuously occurs in the cylinder, and there is no large pressure change, thereby a pumping loss due to a pressure difference is relatively small.

If the expansion stroke and the exhaust stroke proceed in the state where the intake valve is closed, the intake valve is closed after top dead center, and thus a negative pressure in the cylinder occurs in the expansion-exhaust stroke thereafter. At this time, since the cylinder is closed, the air in the cylinder serves as an air spring.

That is, the engine implementing the cylinder stop according to the form of the present disclosure may reduce the pumping loss because the pressure change in the cylinder is relatively small.

Figure 8:
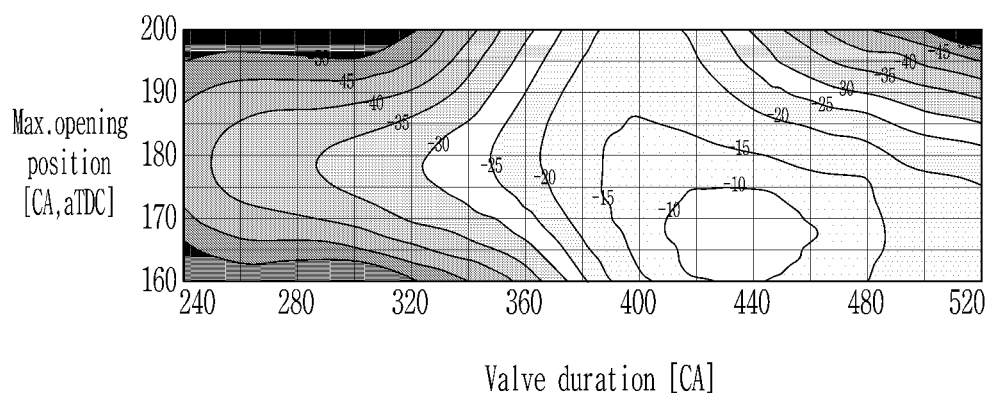
FIG. 8 is a graph showing a pumping loss according to an intake valve operation of an engine for realizing cylinder deactivation according to an exemplary form of the present disclosure.

FIG. 8 is a graph showing a pumping loss according an intake valve operation of an engine for realizing cylinder deactivation according to an exemplary form of the present disclosure.

As shown in FIG. 8, in order to reduce or minimize the pumping loss using fluid inertia, an intake valve duration of longer than the 360 degree crank angle of the intake-compression stroke is desired, and the pumping loss may be reduced if the valve is opened before the intake stroke top dead center and the valve is closed after the compression stroke TDC.

Figure 9:
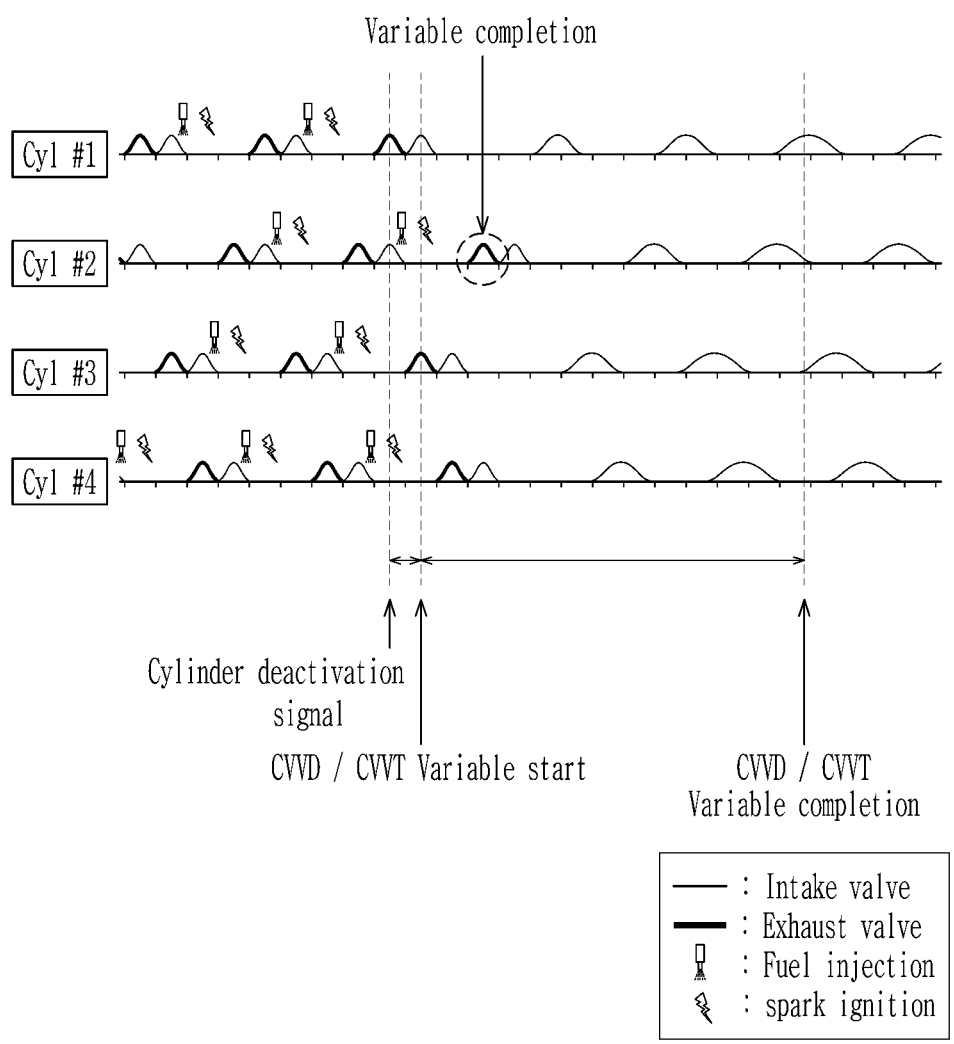
FIG. 9 is a graph showing a control method of an engine for realizing cylinder deactivation according to an exemplary form of the present disclosure.

FIG. 9 is a graph showing a control method of an engine for realizing cylinder deactivation according to an exemplary form of the present disclosure.

In describing the engine for implementing the cylinder deactivation according to one form of the present disclosure, a four-cylinder engine (Cyl #1 to Cyl #4) is described for convenience of understanding, and an ignition order is an order of a first cylinder (Cyl #1), a third cylinder (Cyl #3), a fourth cylinder (Cyl #4) and a second cylinder (Cyl #2), but is not limited to this, and it is applicable to various types of engines and ignition sequences.

Referring to FIG. 9, if it is determined that the controller 100 corresponds to the CDA operation mode of the operation state of the engine according to the output signal of the operation state signal unit 20, the cylinder deactivation signal is outputted.

Thus, for example, the controller 100 stops the operation of the igniter 70 and the injector 80 for the first cylinder (Cyl #1), outputs the signal for increasing the duration of the intake valve by controlling the operation of the duration apparatus 40, and outputs the signal for stopping the operation of the exhaust valve by controlling the operation of the CDA apparatus 50.

In this case, the controller 100 outputs the cylinder deactivation signal according to the ignition order, for example, the order of the first cylinder (Cyl #1), the third cylinder (Cyl #3), the fourth cylinder (Cyl #4), and the second cylinder (Cyl #2).

The controller 100 controls the operation of the CDA apparatus 50 so as to stop of the operation of the exhaust valve after the opening of the exhaust valve at least one time, after the signal for stopping the operation of the igniter 70 and the injector 80.

That is, when the exhaust valve is deactivated after the exhaust valve is operated at least once, for example, once after the last firing, when the intake valve is opened, the difference between the intake pressure and the exhaust pressure may be reduced and fast responsiveness may be obtained.

The increasing in the duration of the intake valve may be completed after the operation of the exhaust valve is stopped.

That is, as shown in FIG. 9, after the operation signal of the duration apparatus 40, the duration increasing of the intake valve may be completed after six engine rotations (after three cycles).

The duration apparatus 40 and the CDA apparatus 50 may be mounted to all cylinders, and the controller 100 may sequentially perform the deactivation of all cylinders by controlling the operations of the duration apparatus 40 and the CDA apparatus 50 according to the ignition order.

The engine for realizing the deactivation according to an exemplary form of the present disclosure may further include the above-described valve timing apparatus 60, and the controller 100 may sequentially output the signal for stopping the operations of the igniter 70 and the injector 80, the signal for increasing the duration of the intake valve by controlling the operation of the duration apparatus 40, the signal for retarding the valve timing of the intake valve by controlling the operation of the valve timing apparatus 60, and the signal for stopping the operation of the exhaust valve by controlling the operation of the CDA apparatus 50.

In addition, the duration increasing and the valve timing retarding of the intake valve may be completed after the operation of the exhaust valve is stopped.

FIGS. 10A and 10B show graphs comparing a P-V line diagram of a typical engine and a P-V line diagram of an engine for realizing cylinder deactivation according to an exemplary form of the present disclosure.

Referring to FIG. 10A, in a case of the operation in the CDA mode of the engine to which a typical CDA apparatus is mounted, the pressure change in the cylinder is relatively large, however as shown in FIG. 10B, the engine for realizing the cylinder deactivation according to an exemplary form of the present disclosure has a relatively lower pumping mean effective pressure (PMEP), thereby reducing the pumping loss due to the pressure difference. That is, the engine implementing the cylinder deactivation according to the exemplary form of the present disclosure may reduce the pumping loss because the relative pressure change in the cylinder is relatively small.

In addition, in the case of an engine implementing the cylinder deactivation according to an exemplary form of the present disclosure, since the intake valve continues to operate in the state that the exhaust valve is deactivated, the inflow and outflow of air is free, and the convergence speed during the switching of the engine operation and cylinder deactivation is fast and the switching impact is alleviated.

That is, the intake stroke and the compression stroke proceed in the state that the intake valve is opened. Therefore, the piston moves up and down, the inflow and outflow of the fresh air into the cylinder continuously occur, and there is no large pressure change, so the pumping loss due to the pressure difference is relatively small.

FIGS. 11A and 11B shows graphs comparing torque changes of a typical engine and an engine for realizing cylinder deactivation according to an exemplary form of the present disclosure.

As shown in FIG. 11B, compared to a torque change of the engine in the CDA mode of the engine equipped with a typical CDA apparatus shown in FIG. 11A, in the case of the engine realizing the cylinder deactivation according to an exemplary form of the present disclosure, since the engine is operated at a low pressure level during the cylinder deactivation, a torque fluctuation of the engine is relatively small such that an NVH characteristic is excellent.

Since the engine implementing the cylinder deactivation according to the exemplary form of the present disclosure may deactivate all cylinders such that there is no exhaust flow, it is possible to actively use the fuel-cut without worrying about the catalytic oxidation of the exhaust system, and improving the fuel consumption during the vehicle coasting.

In addition, the cylinder deactivation of the engine may be implemented by applying the valve deactivation apparatus only to the exhaust, thereby reducing a cost and simplifying the system.

Further, the engine implementing the cylinder deactivation may suppress blowby generation during the time that the intake valve is opened, thereby reducing the pumping loss.

Also, in the engine implementing the cylinder stop according to the form of the present disclosure, since the intake valve is continuously operated during the cylinder deactivation, the inflow and outflow of the air are free and the operation switching of the typical operation mode and the CDA mode may be fast, and the impact during the switching be alleviated.

In the case of a typical cylinder idle engine, a switching time of about 10 cycles is required, but a mode change between normal operation and CDA operation is possible after about 3 cycles after the CVVD/CVVT variable start in the engine implementing the cylinder deactivation according to the exemplary form of the present disclosure.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

| | |
|---|---|
| 20: operation state signal unit | 22: accelerator pedal sensor |
| 24: brake pedal sensor | 26: atmospheric temperature sensor |
| 28: coolant temperature sensor | 30: rpm sensor |
| 40: duration apparatus | 50: CDA apparatus |
| 60: valve timing apparatus | 70: igniter |
| 80: injector | 100: controller |

What is claimed is:

1. A control method of an engine, where the engine includes a duration apparatus for adjusting an opening duration of an intake valve, a Cylinder De-Activation (CDA) apparatus for controlling deactivation of an exhaust valve, an igniter, an injector for injecting a fuel, an operation state signal unit for measuring an operation state of a vehicle and outputting a corresponding signal, and a controller for controlling the duration apparatus, the CDA apparatus, the igniter, and the injector based on the output signal from the operation state signal unit, the control method comprising:
determining, by the controller, whether the operation state of the vehicle corresponds to a CDA operation mode based on the output signal from the operation state signal unit; and
when the CDA operation mode is determined, operating, by the controller, the CDA apparatus,
wherein in the CDA operation mode, the controller is configured to:
stop operations of the igniter and the injector,
increase an opening duration of the intake valve by controlling the duration apparatus, and
stop the operation of the exhaust valve by controlling the CDA apparatus.

2. The control method of the engine of claim 1, wherein in operating the CDA apparatus,
the controller is configured to sequentially output a signal for stopping the operation of the igniter and the injector, a signal for increasing the opening duration of the intake valve by controlling the duration apparatus, and a signal for stopping the operation of the exhaust valve by controlling the CDA apparatus.

3. The control method of the engine of claim 2, wherein the controller is configured to control the operation of the CDA apparatus so as to stop the operation of the exhaust valve after opening the exhaust valve at least one time after the signal for stopping the operations of the igniter and the injector is generated.

4. The control method of the engine of claim 2, wherein increasing the opening duration of the intake valve is completed after stopping the operation of the exhaust valve.

5. The control method of the engine of claim 4, wherein the intake valve is opened before a top dead center in an intake stroke and is closed after the top dead center in a compression stroke in the CDA operation mode.

6. The control method of the engine of claim 1, wherein:
the duration apparatus and the CDA apparatus are both mounted to all cylinders, and
the controller is configured to sequentially perform deactivation of all cylinders by controlling the operations of the duration apparatus and the CDA apparatus based on an ignition order.

7. The control method of the engine of claim 1, wherein the duration apparatus is a continuously variable valve duration (CVVD) apparatus.

8. The control method of the engine of claim 1, wherein the duration apparatus is a continuously variable valve lift (CVVL) apparatus.

9. The control method of the engine of claim 1, wherein:
the engine further includes a valve timing apparatus for adjusting an opening timing and a closing time of the intake valve, and
in operating the CDA, the controller is configured to retard the closing timing of the intake valve by controlling the valve timing apparatus.

10. The control method of the engine of claim 9, wherein in operating the CDA,
the controller is configured to sequentially output a signal for stopping the operations of the igniter and the injector, a signal for increasing the opening duration of the intake valve by controlling the duration apparatus, a signal for retarding the closing timing of the intake valve by controlling the valve timing apparatus, and a signal for stopping the operation of the exhaust valve by controlling the CDA apparatus.

11. The control method of the engine of claim 10, wherein increasing the opening duration of the intake valve and retarding the closing timing of the intake valve are completed after stopping the operation of the exhaust valve.

12. An engine for controlling cylinder deactivation, the engine comprising:
a duration apparatus configured to adjust an opening duration of an intake valve;
a valve timing apparatus configured to adjust an opening timing and a closing timing of the intake valve;
a Cylinder De-Activation (CDA) apparatus configured to control deactivation of an exhaust valve;
an igniter;
an injector configured to inject a fuel;
an operation state signal unit configured to measure an operation state of a vehicle and output a corresponding signal; and
a controller configured to:
control the operations of the duration apparatus, the valve timing apparatus, the CDA apparatus, the igniter, and the injector based on the output signal of the operation state signal unit,
determine a CDA operation mode based on the output signal of the operation state signal unit, and
when the CDA operation mode is determined, stop the operation of the igniter and injector, increase the opening duration of the intake valve by controlling the duration apparatus, retard the closing timing of the intake valve by controlling the valve timing apparatus, and stop an operation of the exhaust valve by controlling the CDA apparatus.

13. The engine of claim 12, wherein in the CDA operation mode,
the controller is configured to sequentially output a signal for stopping the operations of the igniter and the injector, a signal for increasing the opening duration of the intake valve by controlling the duration apparatus, a signal for retarding the closing timing of the intake valve by controlling the valve timing apparatus, and a signal for stopping the operation of the exhaust valve by controlling the CDA apparatus.

14. The engine of claim 13, wherein the controller is configured to control the operation of the CDA apparatus so as to stop the operation of the exhaust valve after opening the exhaust valve at least one time after the signal for stopping the operations of the igniter and the injector is generated.

15. The engine of claim 14, wherein increasing the opening duration of the intake valve is completed after stopping the operation of the exhaust valve.

16. The engine of claim 13, wherein the intake valve is opened before a top dead center in an intake stroke and is closed after the top dead center in a compression stroke in the CDA operation mode.

17. The engine of claim 12, wherein:
the duration apparatus, the valve timing apparatus, and the CDA apparatus are mounted to all cylinders, and
the controller is configured to sequentially perform deactivation of all cylinders by controlling the duration apparatus, the valve timing apparatus, and the CDA apparatus based on an ignition order.

18. The engine of claim 12, wherein the duration apparatus is a continuously variable valve duration (CVVD) apparatus.

19. The engine of claim 12, wherein the duration apparatus is a continuously variable valve lift (CVVL) apparatus.

* * * * *